3,503,453
SEMI-INTEGRAL REVERSIBLE DISK PLOW
WITH STEERABLE TRANSPORT WHEEL
Bruno Bernhardt Johannsen, Moline, and Robert Earl
Cox, Rock Island, Ill., assignors to Deere & Company,
Moline, Ill., a corporation of Delaware
Filed Dec. 11, 1967, Ser. No. 689,704
Int. Cl. A01b 3/40
U.S. Cl. 172—212　　　　　　　　　　　　　　　　7 Claims

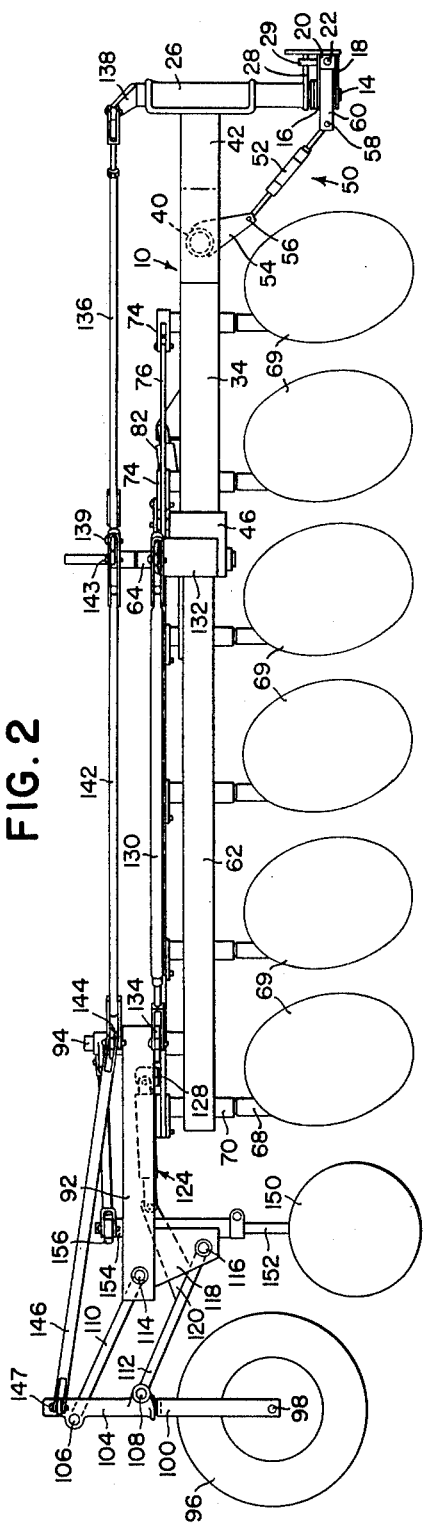
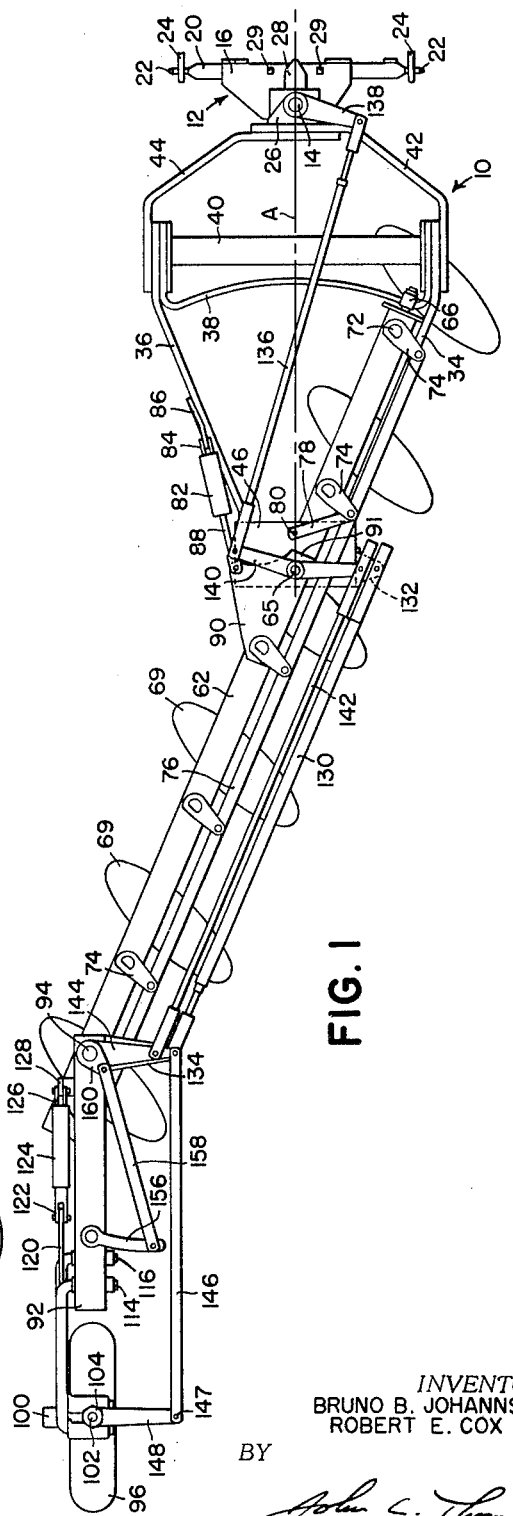
FIG. 2
FIG. 1
INVENTORS.
BRUNO B. JOHANNSEN
ROBERT E. COX
BY
ATTORNEY United States Patent Office 3,503,453
Patented Mar. 31, 1970

ABSTRACT OF THE DISCLOSURE

A reversible disk plow having a main frame which is interconnectible with tractor draft links through means of a pivot post carried by a mounting structure. Pivotally carried on the main frame is a subframe to which disk plow standards are rotatably secured. A reversing cylinder mounted on the main frame can swing the subframe from right to left sides. Pivotally secured to the rear end of the subframe is a wheel mounting frame which carries at its rear end a transport wheel that can be raised and lowered by a second cylinder. The wheel mounting frame is held parallel to the fore-and-aft center line of the main frame by a parallelogram link which interconnects the wheel mounting frame with the main frame. A steering arm on the pivot post is interconnected with a steering arm on the transport wheel by three steering links and two intermediate arms that are carried by the pivot pins which interconnect the subframe with the main frame and the wheel carrying frame.

Field of the invention

The present invention relates generally to agricultural implements, and more particularly to reversible disk plows.

Description of the prior art

Since the tractor three-point hitch has become common, most disk plows, whether one-way or two-way, have been mounted on the three-point hitch. The mounted plow, which is more commonly referred to as an integral plow, is carried solely by the tractor when it is raised into its transport position. As tractor horsepower has increased in recent years, it has been desirable to increase the number of bottoms on the plow to more effectively utilize the available horsepower. Also, it has been desirable to increase the spacing between the plow bottoms to increase the trash clearance of the plows. These two factors have caused the weight of the plow to be increased, and also has caused the center of gravity of the plow to be moved further to the rear of the hitch point. The weight of the tractor, however, limits the size and weight of the plow, and it is not possible to build integral plows of more than four or five bottoms without impairing front end stability of most of today's agricultural tractors. Therefore, it has become desirable to support the rear end of the disk plow on a vertically movable transport wheel whereby the front end of the plow can be raised by the draft links of the tractor three-point hitch and the rear end of the plow by the vetrically movable transport wheel.

Prior to 1967, applicant was not aware of any commercial semi-integral reversible disk plows. The U.S. patent to Fowler No. 2,764,075, discloses a mounted reversible disk plow whose front and rear ends may be raised through a cylinder 70. This plow, however, is not adaptable to a conventional three-point tractor hitch. Also, it suffers from further disadvantages, one of them being that the rear transport wheel assembly 33 is not steerable. It should be noted that it is advantageous to have the rear wheel steerable since this will reduce the head-lands needed at the end of the row when turning around, and it will also make it easier to contour plow.

In early 1967, International Harvester introduced the 1-46 two-way disk plow which had a vertically movable tail wheel which permitted the front end of the plow to be raised by a tractor three-point hitch assembly and the rear end by the rear wheel. This design was also disadvantageous in that no means was provided for steering the rear transport wheel.

SUMMARY OF THE INVENTION

It is a principal object of the present invention to provide a reversible disk plow having a steerable rear transport wheel.

More particularly, it is an object of the present invention to provide a reversible disk plow having mounted at its rear end a vertically movable rear transport wheel, the rear transport wheel being secured to mounting structure swingable from one side to the other of the fore-and-aft center line of the main frame of the disk plow.

It is a further object of the present invention to provide a semi-mounted disk plow having a steerable rear furrow wheel and a rear guide wheel which is movable in response to movement of the plows from a right-hand plowing position to a left-hand plowing position and vice versa.

It is a further object of the present invention to provide a semi-mounted reversible disk plow having a steerable rear transport wheel in which a steering link interconnects the rear transport wheel with a forward mounting structure on which the forward portion of the disk plow structure is mounted for swinging movement relative to a tractor.

These and other objects and advantages of this invention will be apparent to those skilled in the art after a consideration of the following detailed description, taken in conjunction with the accompanying drawings in which the preferred form of this invention is illustrated.

Brief description of the drawings

FIG. 1 is a plan view of a semi-mounted reversible disk plow in which the principles of this invention have been incorporated.

FIG. 2 is a side view of the plow shown in FIG. 1.

DESCRIPTION OF THE PREFERRED EMBODIMENT

In the following description right-hand and left-hand reference is determined by standing to the rear of the disk plow and facing the direction of travel.

The disk plow in which the principles of the present invention are incorporated has a main frame portion, indicated generally at 10, which is secured at its forward end to a mounting structure, indicated generally at 12, for swinging or turning movement relative to the mounting structure about a vertically extending pivot post 14. The pivot post 14 is nonrotatably secured to the mounting structure 12, and to this end it is rigidly secured to spaced apart upper and lower plates 16, 18, respectively. Disposed between the forward ends of the plates 16, 18 is a cross bar 20 having reduced end portions 22 which are connectible to the lower draft links 24 of a farm tractor having a conventional three-point hitch. The main frame 10 of the disk plow is provided with a vertically extending sleeve portion 26 which is journaled for rotation about the pivot post 14. The lower forward end of the sleeve portion 26 is provided with a forwardly extending lug 28 which limits swinging movement of the plow, the lug 28 contacting one of the stops 29 when the plow has been turned to one of its extreme positions.

The main frame 10 includes right and left side frame members 34, 36 which are bolted at their forward ends to a transversely extending subframe supporting member 38, a transversely extending brace 40, and right- and left-hand front members 42, 44. The right and left front frame members 42, 44 are bolted to each other and to the sleeve member 26. The right and left side front frame members 34, 36 and 42, 44 are spaced equally to the sides of the fore-and-aft center line A of the main frame 10. The rear ends of the right and left side frame members 34, 36 are secured to a box frame member 46, open at its forward and rear ends.

A brace member 50 (not shown in FIG. 1) interconnects a lower portion of the pivot post 14 with the transverse brace 40 to prevent fore-and-aft shifting of the pivot post relative to the main frame 10. The brace 50 includes a turnbuckle assembly 52 which is secured at its upper rear end to a downwardly extending plate 54 carried by the brace 40, the turnbuckle being interconnected with the plate by means of pin 56. The lower forward end of the turnbuckle is secured by means of a pivot pin 58 to a sleeve member 60 disposed about the lower end of the pivot post 14.

A subframe 62 is mounted on the main frame for swinging about a vertically extending axis between right- and left-hand plowing positions, FIG. 1 showing the subframe in its right-hand plowing position. An intermediate portion of the subframe is journaled about a pivot post 64 carried within the open box member 46. A forward portion of the subframe 62 is provided with a forwardly extending roller 66 which rolls on the subframe supporting member 38 when the subframe is swung between its right- and left-hand plowing positions.

A plurality of disk plow bodies 69 are mounted on the subframe and to this end it should be noted that the disks 69 are carried by the lower end of standards 68, the upper end of the standards 68 being journaled for rotation within vertically extending sleeves 70 welded within the subframe 62. Each of the standards is provided with a key-shaped upper end 72 to which an angling crank arm 74 is secured. The crank arms 74 of the various standards are interconnected with each other by a link 76 which extends parallel to the subframe 62. A further link 78 is interconnected with one of the crank arms 74 and a pin 80 on the frame 46, the pin 80 being disposed on the fore-and-aft center line A of the main frame. Link 78 causes the plow standards to be properly angled as the subframe is swung between its right- and left-hand plowing positions.

To swing the subframe between its right- and left-hand plowing positions, a cylinder 82 is provided, the anchor end 84 of the cylinder being secured to an upstanding bracket 86 carried by the left side member 36. The cylinder rod 88 of the cylinder 82 is interconnected with triangular angling bracket 90 having one apical portion 91 rotatably disposed about pivot post 64, another apical portion being carried by the upper end of one of the standards 68.

A wheel mounting frame 92 is carried by the rear end of the subframe 62. To this end the subframe 62 is provided with a pivot post 94 about which the forward end of the mounting frame 92 is journaled. A steerable rear transport wheel 96 is carried by the wheel mounting frame 92 for both vertical movement relative to the frame 92, and also for turning movement about a generally vertically extending axis so that the rear end of the disk plow may be steered as the tractor turns relative to the main frame of the plow. The rear wheel 96 is mounted for rotation about a transversely extending axle 98 carried by the lower legs of a bifurcated member 100, the upper end of the bifurcated member terminating in a shaft 102 journaled for rotation in a casting 104. The casting is carried by the transversely extending rear end portions 106, 108 of upper and lower parallel arms 110, 112 respectively. The forward ends of arms 110, 112 are also transversely extending, and these forward portions 114, 116, respectively are journaled for rotation within the frame 92 and a lower depending portion 118. The portion 118 is secured to the frame 92 in a conventional manner.

To move the wheel 96 vertically, a bracket 120 is secured to the upper surface of the lower arm 112 and is apertured at its forward end. The rod end 122 of a cylinder assembly 124 is secured to the bracket and the anchor end 126 of the cylinder is secured to a bracket 128 carried by the frame 92. Extension and retraction of the cylinder assembly 124 will cause the wheel 96 to be moved vertically with respect to the wheel frame 92 as well as the subframe 68, extension of the cylinder causing the wheel 96 to move downwardly relative to the frame 92, while retraction of the cylinder will cause the wheel 96 to move upwardly.

The wheel frame 92 is maintained generally parallel to the fore-and-aft center line of the main frame 10. To this end a parallelogram linkage is provided which includes a link 130 pivotally secured at its forward and rear ends to a bracket 132 carried to one side of the main frame of the plow and at its rear end to a bracket 134 carried to the same side of the frame member 92. The distance between the point of pivotal interconnection of the link 130 with the bracket 132 and the center line A of the main frame 10 is the same as the distance between the point of pivotal interconnection of the rear end of the link 130 with the bracket 134 and the pivot post 94 about which the frame 92 swings relative to the subframe 62. Thus, the link 130 with the brackets 132 and 134 forms a parallelogram linkage with the subframe 62.

To steer the rear wheel 96 relative to the wheel frame 92 as the main frame turns relative to the mounting frame 12, a steering linkage assembly is provided which includes three steering links and two intermediate arms. The first steering link 136 is pivotally secured at its forward end to a steering arm 138 carried by the pivot post 14. The rear end of the first steering link 136 is pivotally secured at 139 to an intermediate link 140 which is journaled for rotation about the reduced upper end portion 65 of the post 64. The second steering link 142 is pivotally secured at 143 to the other end of the intermediate link 140, and the rear end of the second steering link is secured to a second intermediate link 144 journaled for rotation about the upper end of the pivot post 94. The third steering link 146 is pivotally secured to the outer end portion of the second intermediate link 144 at its forward end, and the rear end of the third steering link 146 is pivotally secured at 147 to a steering arm 148 fixed to the shaft 102.

In operation, when plowing, the lower links 24 are lowered and the rear wheel 96 is raised thus disposing the disks 69 in the ground. A rear guide wheel 150 is mounted on the wheel frame 92 and holds the rear end of the subframe to the desired plowing angle. After one pass has been made through the field, the plow is then raised by raising the draft links 24 and lowering the wheel 96 relative to the frame 62, 92 of the plow, thus raising the plow relative to the ground. As previously noted, the wheel is lowered by extending the cylinder 124. At this time, the plow will then be turned around so a second pass can be made through the field adjacent the first one and the disks will also be shifted from their right plowing position to their left plowing position or vice versa. When turning the tractor relative to the plow, the mounting structure 12 will turn relative to the main frame 10. This will cause the rear wheel 96 to be turned by the interconnecting linkage 138, 136, 140, 142, 144, 146, 148 materially reducing the headland needed at the end of the field. Also, the subframe 62 will be shifted by extending or retracting the cylinder 82. During this shifting operation, the wheel frame 92 will be held parallel to the fore-and-aft center line A of the main frame 10. This will permit the wheel 96 to be steered regardless of the position of the frame 92 relative to the main frame 10. As the frame 62 is shifted from one position to the other, the wheel 150 will be angled so that in its next position it will properly hold the rear end of the subframe 62 into the ground.

To provide for proper angling of the wheel 150, it is carried on a vertically extending shaft 152 journaled for rotation within sleeve 154 carried by the frame 92, the upper end of the shaft 152 having an arm 156 which is interconnected through push-pull link 158 with an angling link 160 carried by the post 94. Thus, as the subframe is swung from its right-hand plowing position, shown in FIG. 1, to its left-hand plowing position, the wheel is shifted from the right-hand angled position to a left-hand angled position due to the fact that the link 158 is advanced forwardly which will cause the arm 156 and wheel 150 to be rotated.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

What is claimed is:

1. A semi-mounted reversible plow adapted to be propelled forwardly by a tractor comprising: a plow frame on which a plurality of plow bottoms are mounted for movement between right- and left-hand plowing positions, mounting structure securable to a tractor to be suspended thereby, means swingably mounting the plow frame on the mounting structure, said plow frame including a main frame swingably secured to said mounting structure and a subframe secured to said main frame for horizontal swinging movement between right- and left-hand plowing positions, said plow bodies being mounted on said subframe, wheel support means in which a steerable rear transport wheel assembly is journaled for steerable movement, means mounting said wheel support means to a rear portion of said subframe for horizontal swinging movement from a position to one side of and generally parallel to the fore-and-aft center line of the plow frame to a position on the other side of and generally parallel to said fore-and-aft center line as the plow bodies are moved between right- and left-hand plowing positions, and means interconnecting the mounting structure with the steerable rear transport wheel assembly to transmit turning movement of the main frame relative to the mounting structure to the rear transport wheel assembly.

2. The semi-mounted reversible plow set forth in claim 1 further characterized by the provision of parallelogram linkage means interconnecting said wheel support means with said main frame whereby the fore-and-aft center line of the wheel support means is held generally parallel to the fore-and-aft center line of the main frame as the subframe is swung between right- and left-hand plowing positions.

3. A semi-mounted reversible plow adapted to be propelled forwardly by a tractor having a pair of draft links, the plow comprising: a main frame, a hitch frame securable to the tractor draft links, means mounting the main frame on the hitch frame for swinging movement about a generally upright axis, a subframe, first pivot means interconnecting said subframe to said main frame for horizontal swinging movement between right- and left-hand plowing positions, said subframe carrying a plurality of plow bodies, a wheel support frame, second pivot means interconnecting said wheel support frame to the rear end of said subframe for horizontal swinging, parallelogram link means interconnecting the wheel support frame with the main frame to maintain the wheel support frame generally parallel to the fore-and-aft center line of the main frame as the rear end of the subframe is swung from one side to the other of the fore-and-aft center line, rear transport wheel means steerable in response to turning movement of the main frame relative to the mounting structure, said rear transport wheel means being mounted on said wheel support means for affording vertical movement of the support means relative thereto, and means operable to raise and lower the wheel support means on said rear transport wheel.

4. The semi-mounted reversible plow set forth in claim 3 further characterized by the provision of a rear guide wheel means carried by said wheel support frame, and means interconnecting said rear guide wheel means with said subframe to position the guide wheel in different positions of angular adjustment as the subframe is swung between its right- and left-hand plowing positions.

5. The semi-mounted reversible plow set forth in claim 3 in which link means are provided which interconnect the hitch frame with the steerable rear transport wheel to transmit turning movement of the plow frame relative to the hitch frame to the rear transport wheel means thereby turning the same.

6. The semi-mounted reversible plow set forth in claim 5 in which said link means comprises: a first intermediate link mounted for swinging movement about said first pivot means, a first steering link interconnected at one end with said hitch frame and at the other end with said first intermediate link, a second intermediate link mounted for swinging movement about said second pivot means, a second steering link interconnected at one end with said first intermediate link and at the other end with said second intermediate link, and a third steering link interconnected at its forward end with said second intermediate link and at its rear end with said rear transport wheel means.

7. A semi-mounted reversible disk plow adapted to be propelled forwardly by a tractor having a pair of draft links, the plow comprising: a main frame, a hitch frame securable to the tractor draft links, means mounting the main frame on the hitch frame for swinging movement about a generally upright axis, a subframe pivotally secured to said main frame for horizontal swinging movement between right- and left-hand plowing positions, said subframe carrying a plurality of plow bodies, rear transport wheel means interconnected with said subframe for generally vertical movement relative to said subframe whereby the plows may be moved between a raised transport position and a lowered ground-working position, and link means interconnecting said rear transport wheel means with said mounting structure and operable to transmit turning movement of the plow frame relative to the mounting structure to the rear furrow wheel means thereby turning the same.

References Cited

UNITED STATES PATENTS

| 2,675,749 | 4/1954 | Pursche | 172—324 XR |
| 2,732,781 | 1/1956 | Coviello | 172—212 |
| 2,818,007 | 12/1957 | Silver et al. | 172—212 |
| 3,061,020 | 10/1962 | Mannheim | 172—285 |

ROBERT E. PULFREY, Primary Examiner

JAMES W. PETERSON, Assistant Examiner

U.S. Cl. X.R.
172—285, 413, 417